(12) United States Patent
Frimberger et al.

(10) Patent No.: US 6,256,562 B1
(45) Date of Patent: Jul. 3, 2001

(54) CONTROL CONFIGURATION FOR AN OCCUPANT PROTECTION SYSTEM FOR SIDE COLLISION PROTECTION IN A VEHICLE

(75) Inventors: Manfred Frimberger, Ergoldsbach; Gerhard Mader, Thalmassing, both of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/302,656

(22) Filed: Apr. 30, 1999

Related U.S. Application Data

(63) Continuation of application No. PCT/DE97/02462, filed on Oct. 22, 1997.

(30) Foreign Application Priority Data

Oct. 31, 1996 (DE) .......................... 196-45-079-9

(51) Int. Cl.$^7$ .............................. B60R 21/32; B60Q 1/00
(52) U.S. Cl. .............................. 701/45; 701/40; 340/669; 340/436; 340/429; 180/282; 307/10.1
(58) Field of Search ........................ 701/45, 46; 280/734, 280/735, 736

(56) References Cited

U.S. PATENT DOCUMENTS

| | | |
|---|---|---|
| 3,931,527 | 1/1976 | Oishi et al. .................... 307/10 R |
| 4,166,641 | 9/1979 | Okada et al. .................... 280/735 |
| 4,975,850 | 12/1990 | Diller ............................ 364/424.05 |
| 5,083,276 * | 1/1992 | Okano et al. .................... 364/424.05 |
| 5,285,187 * | 2/1994 | Hirao et al. .................... 340/436 |
| 5,440,485 * | 8/1995 | Okimoto et al. ................. 364/424.05 |
| 5,483,451 * | 1/1996 | Ohmae et al. ................... 364/424.05 |
| 5,544,915 | 8/1996 | Fendt et al. ..................... 280/735 |
| 5,892,435 * | 4/1999 | Buchheim et al. ................. 340/438 |

FOREIGN PATENT DOCUMENTS

| | | |
|---|---|---|
| 3816588A1 | 11/1989 | (DE) . |
| 9001803 | 6/1990 | (DE) . |
| 4034971A1 | 5/1991 | (DE) . |
| 4016644A1 | 11/1991 | (DE) . |
| 4244264A1 | 7/1993 | (DE) . |
| 4318350A1 | 12/1993 | (DE) . |
| 4242230A1 | 6/1994 | (DE) . |
| 4403502A1 | 8/1994 | (DE) . |
| 0342401A2 | 11/1989 | (EP) . |
| 0517253A1 | 12/1992 | (EP) . |
| 2263571A | 7/1993 | (GB) . |

OTHER PUBLICATIONS

Published International Application No. 90/11207 (Eigler et al.), dated Oct. 4, 1990.
Published International Application No. 92/05979 (Huber et al.), dated Apr. 16, 1992.
"Steuerung eines Mehrfach–Rückhaltesystems" (Controls for a Multiple Passenger Restraint System), Guide Wetzel, ATZ Automobiltechnische Zeitschrift, Oct. 1994, No. 10, Stuttgart, pp. 618/619.

* cited by examiner

*Primary Examiner*—William A. Cuchlinski, Jr.
*Assistant Examiner*—Tuan C To
(74) *Attorney, Agent, or Firm*—Herbert L. Lerner; Laurence A. Greenberg; Werner H. Stemer

(57) ABSTRACT

In a control configuration for an occupant protection system for side collision protection in a vehicle, an enable signal of a protection configuration generated as a function of transverse acceleration, is delivered to a timer. The timer furnishes an enable signal of a fixed minimum duration for triggering the occupant protection system.

7 Claims, 1 Drawing Sheet

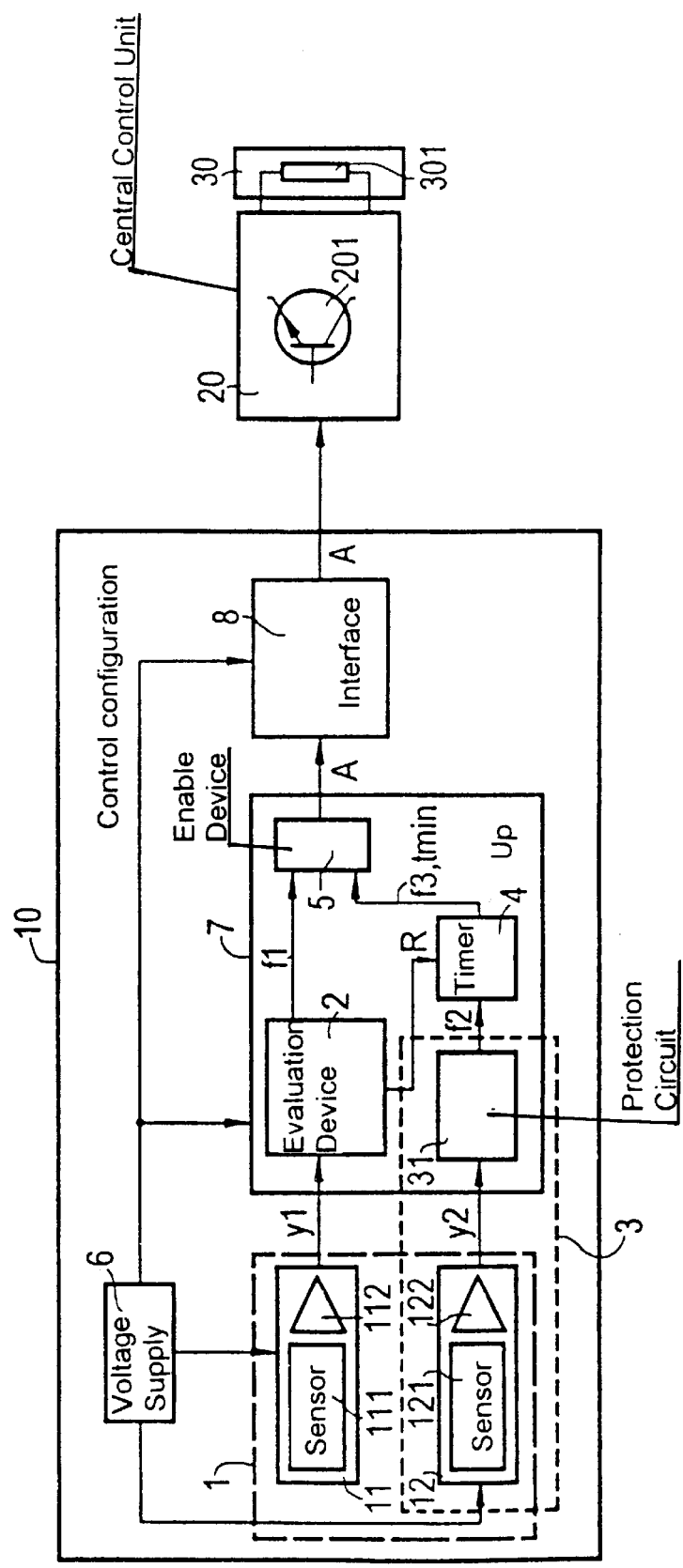

CONTROL CONFIGURATION FOR AN OCCUPANT PROTECTION SYSTEM FOR SIDE COLLISION PROTECTION IN A VEHICLE

CROSS-REFERENCE TO RELATED APPLICATION

This is a continuation of copending International Application PCT/DE97/02462, filed Oct. 22, 1997, which designated the United States.

BACKGROUND OF THE INVENTION

1. Field of the Invention

The invention relates to a control configuration for an occupant protection system for side collision protection in a vehicle.

From U.S. Pat. No. 5,544,915, a control configuration for an occupant protection system for side collision protection in a vehicle is known which includes one transverse acceleration pickup disposed in the left half of the vehicle, one transverse acceleration pickup disposed in the right half of the vehicle, and one transverse acceleration pickup disposed centrally in the vehicle. The signals furnished by the transverse acceleration pickups are each compared with threshold values. If the threshold values are exceeded by the respective signals, the side air bags, for instance, are tripped.

A control configuration for an occupant protection system for front-end collision protection is disclosed in German Utility Model DE 90 01 803. The occupant protection system is tripped only when the signal, furnished by an electronic acceleration sensor and evaluated in an evaluation device, indicates a severe accident calling for tripping of the airbag and at the same time a mechanical acceleration switch, also known as a safeguard sensor because of its protective function, furnishes an enable signal.

A mechanical acceleration switch of this kind serves to protect the occupants from faulty tripping of the airbag. If it did not exist, a defective electronic acceleration sensor or a defective evaluation device could furnish a control signal and cause the airbag to be tripped. Faulty tripping leads to major repair costs. Furthermore, the health and safety of the occupant can suffer, for instance from the noise generated when the airbag is inflated. In addition, an unexpected inflation of the airbag can make the driver react in an uncontrolled way and can cause an accident, for instance.

The mechanical acceleration switch does not require an energy supply the way an electrical acceleration sensor does. As a rule, it has a magnetic seismic mass, which is deflected by the influence of an acceleration, and which after a defined traversed distance actuates a magnetically controllable switch. The acceleration-dependent response threshold of the mechanical acceleration switch is purposefully set relatively low, so that the acceleration switch in an accident will generate a relatively long-lasting enable signal at a relatively early time, thus specifying a time slot for the actual control signal furnished by the evaluation device.

Since this kind of mechanical acceleration switch cannot be tested, or can be tested only at major effort and expense, as a protection configuration for the control configuration of an occupant protection system, it is proposed in Published, Non-Prosecuted German Patent Application DE 40 16 644 A1 that the mechanical acceleration switch be replaced with a second electronic acceleration sensor and a protection circuit. The analog acceleration signal of the further electronic acceleration sensor is integrated with the analog protection circuit and compared with a threshold value. If the threshold value is exceeded by the integrated acceleration signal, an enable signal is furnished.

From Published, Non-Prosecuted German Patent Application DE 44 03 502 A1, a control configuration is known in which a mechanical acceleration switch, embodied as a safeguard sensor, is replaced with an electronic acceleration sensor and a protection circuit. With a protection configuration embodied in this way, the behavior of a mechanical acceleration switch, especially a "ball-in-tube sensor" known from U.S. Pat. No. 4,329,549, is supposed to be simulated. To that end, a constant acceleration value is subtracted from the acceleration signal furnished by the acceleration sensor, in order to simulate a prestressing of a fictitious seismic mass of a mechanical acceleration switch. Under the influence of the acceleration picked up by the electronic acceleration sensor, the fictitious seismic mass of the simulated acceleration switch is deflected and, if a threshold value is exceeded, furnishes an enable signal. Accordingly, to simulate the acceleration switch, the measured acceleration signal, minus the acceleration value that represents the prestressing, is integrated into the protection circuit and compared with a threshold value.

SUMMARY OF THE INVENTION

It is accordingly an object of the invention to provide a control configuration for an occupant protection system for side collision protection in a vehicle which overcomes the above-mentioned disadvantages of the prior art devices of this general type, that has an effective protection configuration.

With the foregoing and other objects in view there is provided, in accordance with the invention, a control configuration for an occupant protection system for side collision protection in a vehicle, including: a sensor configuration for detecting a transverse acceleration acting on a vehicle, the sensor configuration having a first electronic acceleration pickup outputting a first transverse acceleration signal and a second electronic acceleration pickup outputting a second transverse acceleration signal; an evaluation device receiving and evaluating the first transverse acceleration signal and generating a first enable signal in dependence on the first transverse acceleration signal; a protection configuration receiving and evaluating the second transverse acceleration signal and generating a second enable signal in dependence on the second transverse acceleration signal; a timer receiving the second enable signal and generating a third enable signal with a fixed minimum duration in dependence on the second enable signal; and an enabling device receiving the first enable signal and the third enable signal and generating a control signal for an occupant protection system in dependence on the first enable signal and the third enable signal.

The enable signal generated by the protection configuration of the control configuration as a function of transverse acceleration is delivered to the timer. From the enable signal furnished, the timer generates an enable signal with a fixed minimum duration. The enabling device is connected both to the timer and to the evaluation device, so that a control signal is generated when both a first enable signal, generated by the evaluation device, and the enable signal with the fixed minimum duration derived from the enable signal of the protection configuration are present.

The timer takes the below listed special conditions into account in a side collision.

First, tripping of a side airbag is necessary within a few milliseconds after the onset of the collision, if the occupants are to be effectively protected against any structure penetrating the side of the vehicle. In contrast to the front-end collision, in a side collision the vehicle lacks any extended energy-reducing zone. The site of the collision is only a few centimeters away from the occupants. For this reason, a decision to trip the side air bag must be made as early as possible on the basis of the transverse acceleration that is picked up. Nevertheless, on the basis of the transverse acceleration picked up, a decision must be made whether inflation of the side air bag is needed at all, or not. In a control configuration for an occupant protection system for front-end collision protection, the evaluation device has about 30 ms to assess a longitudinal acceleration of the vehicle that has been picked up and thereupon to make a positive or negative tripping decision. Inflation of the front airbag at what then is an already advanced time after the onset of the collision still protects the occupants effectively against injuries because of the energy-absorbing crumple zone.

The time gained from the crumple zone can be used by the evaluation device for its own purposes.

The more time-critical requirements made of the control configuration for side collision protection involve not only its sensor configuration and the evaluation device but also and in particular its protection configuration. If the protection configuration for front-end collision detection is supposed to furnish an enable signal within at least the first approximately 20–30 ms, the enable signal of a protection configuration for side collision detection must already generate its enable signal within the first 5 ms, in order to furnish an effective time slot for the enable signal of the evaluation device. While the tripping threshold in the protection configuration for front-end collision detection can therefore be set relatively high, in a protection configuration for side collision protection the tripping threshold that is definitive for the enable signal is very low by choice, so that the enable signal can be generated already within the first few milliseconds after the onset of the collision. If an acceleration sensor or acceleration switch associated with the protection configuration for side collision detection is not disposed in a side part of the vehicle near the collision site but instead centrally in the vehicle, then the tripping threshold may have to be reduced still further because of poor signal transmission between the side of the vehicle and the middle of the vehicle.

Both in a front-end collision and a side collision, the acceleration acting on the vehicle can be such that even though a decision about tripping the occupant protection system is made in the evaluation device and the appropriate enable signal is furnished, still the enable signal furnished by the protection configuration may have an interruption or not yet be present, especially if vehicle structures break as a consequence of the collision, so that briefly, positive vehicle acceleration of high amplitude is picked up. In a control configuration for front-end collision protection, such interruptions in the enable signal of the protection configuration can be tolerated, since there is a relatively long period of time available for tripping the occupant protection system, and the enable signal of the protection configuration is regenerated with certainty within this time period. In the control configuration for side collision protection, however, for the reasons given above this time period is not available, and therefore the first time the enable signal of the protection configuration appears, an enable signal with a minimum duration and thus a time slot must be created so that upon a possible occurrence of the enable signal of the evaluation device, the occupant protection system can be tripped immediately.

For this reason, the enable signal of the protection configuration is delivered to a timer that generates an enable signal with a fixed minimum duration, which is preferably greater than 20 ms and in particular greater than 40 ms.

Other features which are considered as characteristic for the invention are set forth in the appended claims.

Although the invention is illustrated and described herein as embodied in a control configuration for an occupant protection system for side collision protection in a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single figure of the drawing is a diagrammatic, block circuit diagram of a control configuration and a control unit for an occupant protection system.

DESCRIPTION OF THE PREFERRED EMBODIMENTS

Referring now to the single figure of the drawing in detail, there is shown a control configuration 10 according to the invention for an occupant protection system 30 for side collision protection in a vehicle. The control configuration 10 is disposed in one half of the vehicle, and a further identically embodied control configuration 10, but not shown further in the drawing, is disposed in the other half of the vehicle. Both control configurations 10 are connected to a central control unit 20 over lines. The central control unit 20 is in turn electrically conductively connected to igniters 301 of an occupant protection system 30. If the control configuration 10 detects a side collision of sufficient severity, a control signal A is sent to the central control unit 20. In the central control unit 20, a symbolic power switch 201 is shown, which is enabled on the basis of the control signal A. The igniter element 301 of the occupant protection system 30 disposed in the applicable half of the vehicle is thus supplied with sufficient energy to trip the occupant protection system 30. The occupant protection system 30 is preferably embodied as a side air bag, which is disposed either on a side portion of the vehicle or on the vehicle seat itself, but it can also be a head airbag, a belt tightener, or other restraint devices for side collision protection. The central control unit 20 also has acceleration sensors for detecting a front-end or oblique collision, as well as an evaluation unit and further power switches for further occupant protection systems, for instance for front-end collision protection. The control signal A is preferably linked by AND logic with a signal of a seat occupation detector, so that the side airbag for the passenger seat is tripped only if both the control signal A generated by the non-centrally disposed control configuration 10 and at the same time an occupant seated on the passenger seat are detected by the central control unit 20.

The control configuration 10 includes a sensor configuration 1 with a first and second acceleration pickup 11 and 12. The first and second acceleration pickups 11 and 12 each have a respective sensor element 111 and 121 and a signal amplifier 112 and 122. Both of the acceleration pickups 11 and 12 are oriented transversely to the longitudinal axis of the vehicle, so that they furnish transverse acceleration signals y1 and y2. If the vehicle structure transversely to the longitudinal axis of the vehicle is embodied rigidly enough that impacts acting on the side of the vehicle are transmitted largely undamped and without delay to the center of the vehicle, then the entire control configuration can be disposed in the central control unit 20.

The control configuration also includes a voltage supply 6, a microprocessor 7, and an interface 8 for data transmission. The voltage supply 6 supplies energy to the two acceleration pickups 11 and 12, the microprocessor 7, and the interface 8. The microprocessor 7 includes an evaluation device 2, an enabling device 5, and a timer 4. The control configuration 10 also includes a protection configuration 3.

The first transverse acceleration signal y1 is evaluated or algorithmaically processed in the evaluation device 2. The first transverse acceleration signal y1, or a signal derived from the first transverse acceleration signal y1, is for that purpose compared for instance with a threshold value that varies over time and optionally is also dependent on the first transverse acceleration signal y1. A first enable signal f1 is furnished to the enabling device 5 as soon as the threshold value has been exceeded by the signal derived from the first transverse acceleration signal y1. If the first enable signal f1 is generated, then a sufficiently severe side collision to require tripping of the occupant protection system 30 is detected.

The protection configuration 3 includes the second acceleration pickup 12 and a protection circuit 31, which is realized in the microprocessor 7. The second transverse acceleration signal y2 is evaluated in the protection circuit 31. As a function of the evaluated second transverse acceleration signal y2, a second enable signal f2 is transmitted by the protection circuit 31 to the timer 4.

The protection configuration 3 is intended to furnish its second enable signal f2 already upon any slight acceleration y acting on the vehicle. In a collision, the second enable signal f2 is as a rule generated substantially earlier than the first enable signal f1, since the generation of the second enable signal f2 expresses the presence of a minimum acceleration acting on the vehicle, but this minimum acceleration alone is not yet intended to lead to tripping of the occupant protection system 30. For generating the first enable signal f1, a substantially higher acceleration y acting on the vehicle, or a characteristic course of acceleration, is necessary.

The timer 4 converts the second enable signal f2, which may optionally be only brief, into a third enable signal f3 of a predetermined minimum duration tmin. The third enable signal f3 is furnished to the enabling device 5. From the enabling device 5, preferably embodied as an AND gate, the control signal A is transmitted to the interface 8 of the control configuration, if the first enable signal f1 and the third enable signal f3 are simultaneously present.

The timer 4 is preferably embodied as a monostable multivibrator, also known as a monoflop, but can also be embodied as a bistable multivibrator; the evaluation device 2 generates a reset signal R for the flip-flop. In each case, even if the second enable signal f2 is of the Dirac type, a third enable signal f3 of a sufficient minimum duration tmin is generated, so that within this minimum duration tmin, the first enable signal f1 will lead to tripping of the restraint device 30.

The timer 4 is embodied in the control configuration 10 independently of the type of protection configuration 3. The above-described protection configuration 3, containing the second acceleration pickup 12 and the protection circuit 31 is advantageous in the sense that even if the first acceleration pickup 11 functions incorrectly or has failed, faulty tripping can be averted by a correctly functioning second acceleration pickup 12. In a further, more economical embodiment of the control configuration 10, only a single acceleration pickup 11 is present, whose transverse acceleration signal y1 is evaluated both in the evaluation device 2 and in the protection circuit 31 of the microprocessor 7, so that at the least, a defectively functioning evaluation device 2 will not cause tripping of the occupant protection system 30. The protection configuration 3 can also have a mechanical acceleration switch, which at a fixed response threshold generates a second enable signal f2.

Preferably, however, as the protection configuration 3, a mechanical acceleration switch acting as a safeguard sensor is simulated, with the aid of the second acceleration pickup 12 and the protection circuit 31. A mechanical acceleration switch as a rule has a deflectable magnetic seismic mass, which actuates a magnetically controllable switch once the mass has covered a fixed distance as a consequence of the acceleration acting upon it. The acceleration acting on the simulated mechanical acceleration switch is furnished by the second acceleration pickup 12.

This kind of simulation of a mechanical acceleration switch has a number of advantages over a real mechanical acceleration switch. In the simulation, production variations, which lead to imprecise thresholds and thus imprecise signal behavior of the real acceleration switch, are omitted in particular. The fictitious seismic mass in the simulated model is not subject to reflection or bouncing. By use of the timer 4, the closing duration of the simulated acceleration switch is artificially prolonged. Furthermore, in a mathematical model for a mechanical safeguard sensor, such parameters as the switching distance or damping can be assumed to be ideal or can be used as desired; in actually existing switches, these parameters can be converted only with extreme difficulty if at all.

Furthermore, in contrast to most mechanical acceleration switches, the electronic acceleration sensor 12 used in the protection configuration 3 is testable, so that its operability can be monitored. A test of the acceleration pickups 11 and 12 can be performed simply, because the two acceleration pickups 11 and 12 can be tested chronologically separately from one another, thus precluding faulty tripping in the test mode.

The sensor parameters of prestressing, restoring force and damping, in particular, are included in the mathematical model of an acceleration switch. By prestressing, which is engendered for instance by a spring or a magnetic force, the seismic mass of the acceleration switch is not deflected from its position of repose until the exertion of a fixed minimum acceleration force. The prestressing prevents the acceleration switch from already reaching its tripping threshold and generating the second enable signal f2 already at vibration levels that pertain in normal driving operation. By a restoring force acting on the seismic mass of the acceleration switch, the acceleration switch is prevented from generating an infinitely long second enable signal F2, even if no acceleration force acts on it any longer. Furthermore, depending on the structural configuration of the acceleration switch, the seismic mass is subjected to damping upon its deflection.

In the protection circuit 31, a differential equation, which is dependent on the embodiment of the safeguard sensor to be simulated is set up and evaluated. With the differential equation below, a safeguard sensor is simulated in which the sensor parameters of damping, restoring force and prestressing represent non-negligible variables. The acceleration $\chi(t)$ of a fictitious seismic mass of such a simulated safeguard sensor is described by the following equation:

$$\ddot{\chi}(t) = -2\omega_0 D \dot{\chi}(t) - \omega_0^2 \chi(t) - F_0/m + y(t)$$

where $\chi(t)$ is the distance traversed by the fictitious seismic mass at time t, $\dot{\chi}(t)$ is the speed attained by the fictitious seismic mass at time t, $\ddot{\chi}(t)$ is the acceleration of the fictitious seismic mass at time t, $\omega_o$ is the resonant frequency of the acceleration switch, D is the damping factor, $F_o$ is the prestressing force, m is the mass of the fictitious seismic mass, $-2\omega_o D \dot{\chi}(t)$ is the damping, $-\omega_o \chi^2(t)$ is the restoring force, $-F_o/m$ is the prestressing, and y(t) or y1(t) or y2(t) is the first transverse acceleration signal y1 or the second transverse acceleration signal y2 picked up by the first or second acceleration pickup 11 or 12 as applicable.

For solving the differential equations, the below listed initial conditions are specified in the protection circuit 31.

The deflection of the fictitious seismic mass at time t=0 is 0, and the speed of the fictitious seismic mass at time t=0 is 0. In the protection circuit 31, the differential equation is now solved, in particular numerically, in accordance with the distance x(t) traversed by the fictitious seismic mass. The protection configuration 3 furnishes the second enable signal f2 if the distance x(t) traversed by the fictitious seismic mass is greater than a predetermined threshold value. This condition for generating the second enable signal f2 is equivalent to the switching condition of the real safeguard sensor, which furnishes an enable signal if the seismic mass, after traversing a defined distance, actuates a magnetically controllable switch.

Depending on the speed of the microprocessor 7 used, or of the protection circuit 31, and on the structural configuration of the safeguard sensor to be simulated, a simpler model for a safeguard sensor can be employed.

For instance, only the prestressing of the fictitious seismic mass is taken into account, so that the associated differential equation is:

$$\chi(t) = y(t) - f_o/m$$

If the safeguard sensor to be simulated has no prestressing but does have adequate damping and an additional restoring force, then the differential equation to be solved is:

$$\ddot{\chi}(t) = -2\omega_0 D \dot{\chi}(t) - \omega_0^2 \chi(t) + y(t).$$

We claim:

1. A control configuration for an occupant protection system for side collision protection in a vehicle, comprising:
   a sensor configuration for detecting a transverse acceleration acting on a vehicle, said sensor configuration having a first electronic acceleration pickup outputting a first transverse acceleration signal and a second electronic acceleration pickup outputting a second transverse acceleration signal;
   at most two paths leaving said sensor configuration, a first of said two paths being electrically connected to said first acceleration pickup and carrying said first transverse acceleration signal, a second of said two paths being electrically connected to said second electronic acceleration pickup carrying said second transverse acceleration signal;
   an evaluation device connected to said first of said two paths, said evaluation device receiving and evaluating the first transverse acceleration signal and generating a first enable signal in dependence on the first transverse acceleration signal;
   a protection configuration connected to said second of said two paths, said protection configuration receiving and evaluating the second transverse acceleration signal and generating a second enable signal in dependence on the second transverse acceleration signal, said second enable signal being generated earlier than said first enable signal;
   a timer receiving the second enable signal and generating a third enable signal with a fixed minimum duration in dependence on the second enable signal; and
   an enabling device receiving the first enable signal and the third enable signal and generating a control signal for an occupant protection system in dependence on the first enable signal and the third enable signal.

2. The control configuration according to claim 1, wherein said second electronic acceleration pickup outputting the second transverse acceleration signal is integrated with said protection circuit, the second transverse acceleration signal is compared with a threshold value, and the second enable signal is generated if the threshold value is exceeded by the second transverse acceleration signal.

3. The control configuration according to claim 1, wherein said protection circuit simulates a mechanical acceleration switch that can be under the influence of a picked up transverse acceleration resulting in a simulated mechanical acceleration switch, said simulated mechanical acceleration switch while under the influence of the picked up transverse acceleration deflecting a fictitious seismic mass, and the second enable signal is generated if said fictitious seismic mass has covered a defined distance.

4. The control configuration according to claim 1, wherein said sensor configuration is two sensors configurations and one of said sensor configurations is disposed in each half of the vehicle.

5. The control configuration according to claim 1, wherein said timer is a multivibrator.

6. The control configuration according to claim 1, wherein the control signal is intended for tripping the occupant protection system.

7. A control configuration for an occupant protection system for side collision protection in a vehicle, comprising:
   a sensor configuration for detecting a transverse acceleration acting on a vehicle, said sensor configuration having a first electronic acceleration pickup outputting a first transverse acceleration signal and a second electronic acceleration pickup outputting a second transverse acceleration signal;
   at most two paths leaving said sensor, a first of said two paths being electrically connected to said first acceleration pickup and carrying said first transverse acceleration signal, a second of said two paths being electrically connected to said second electronic acceleration pickup carrying said second transverse acceleration signal;

an evaluation device connected to said first of said two paths, said evaluation device receiving and evaluating the first transverse acceleration signal and generating a first enable signal in dependence on the first transverse acceleration signal;

a protection configuration connected to said second of said two paths, said protection configuration receiving and evaluating the second transverse acceleration signal and generating a second enable signal in dependence on the second transverse acceleration signal; said protection configuration simulating a mechanical acceleration switch that can be under the influence of a picked up transverse acceleration resulting in a simulated mechanical acceleration switch, said simulated mechanical acceleration switch while under the influence of the picked up transverse acceleration deflecting a fictitious seismic mass, and the second enable signal being generated if said fictitious seismic mass has covered a defined distance;

a timer receiving the second enable signal and generating a third enable signal with a fixed minimum duration in dependence on the second enable signal; and an enabling device receiving the first enable signal and the third enable signal and generating a control signal for an occupant protection system in dependence on the first enable signal and the third enable signal.

* * * * *